(12) United States Patent
Mittal et al.

(10) Patent No.: US 10,171,168 B2
(45) Date of Patent: Jan. 1, 2019

(54) OPTOELECTRONIC TRANSCEIVER WITH POWER MANAGEMENT

(71) Applicant: Intel Corporation, Santa Clara, CA (US)

(72) Inventors: Rohit Mittal, Sunnyvale, CA (US); David S. Dunning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 15/081,784

(22) Filed: Mar. 25, 2016

(65) Prior Publication Data

US 2017/0279593 A1    Sep. 28, 2017

(51) Int. Cl.
| | |
|---|---|
| H04B 10/516 | (2013.01) |
| H04B 10/40 | (2013.01) |
| H04B 10/69 | (2013.01) |
| H04B 10/50 | (2013.01) |
| H04B 10/564 | (2013.01) |
| H04L 7/00 | (2006.01) |

(52) U.S. Cl.
CPC ........... *H04B 10/40* (2013.01); *H04B 10/503* (2013.01); *H04B 10/516* (2013.01); *H04B 10/564* (2013.01); *H04B 10/691* (2013.01); *H04L 7/0083* (2013.01)

(58) Field of Classification Search
CPC .. H04B 10/40; H04B 10/801; H04B 10/1143; H04B 10/503; H04B 10/516; H04B 10/564; H04B 10/691; G02B 6/4246; G02B 6/4292; H04L 7/0083
See application file for complete search history.

(56) References Cited

U.S. PATENT DOCUMENTS

| | | | |
|---|---|---|---|
| 2004/0052520 A1* | 3/2004 | Halgren | H04J 14/0227 398/5 |
| 2005/0169585 A1* | 8/2005 | Aronson | H04B 10/40 385/89 |
| 2007/0280705 A1 | 12/2007 | Knapp et al. | |

(Continued)

OTHER PUBLICATIONS

International Search Report and Written Opinion dated May 30, 2017 for International Application No. PCT/US2017/018605, 14 pages.

*Primary Examiner* — Ted Wang
(74) *Attorney, Agent, or Firm* — Schwabe, Williamson & Wyatt, P.C.

(57) ABSTRACT

Embodiments herein relate to optoelectronic transceivers with power management. An optoelectronic device may include a photodetector, a loss of signal (LOS) detector coupled with the photodetector, and a re-timer coupled with the LOS detector, wherein a component of the re-timer is to be disabled in response to a detection by the LOS detector that an optical signal has not been received for a predetermined time period. In some embodiments, the LOS detector is coupled with a driver disable input of the re-timer and a driver component of the re-timer is to be disabled. In some embodiments, a clock data recovery circuit, a transmit module re-timer and modulator, and/or a laser may be disabled. In various embodiments, components may be re-enabled in response to detection that an optical signal is being received and/or an electrical signal is received for optical transmission. Other embodiments may be described and/or claimed.

17 Claims, 4 Drawing Sheets

(56) References Cited

U.S. PATENT DOCUMENTS

| | | |
|---|---|---|
| 2012/0045202 A1 | 2/2012 | Jiang et al. |
| 2013/0045010 A1 | 2/2013 | Mukai |
| 2015/0207568 A1 | 7/2015 | Ying et al. |
| 2015/0365094 A1* | 12/2015 | Erdogan ................. H03L 7/095 |
| | | 375/371 |

* cited by examiner

OPTOELECTRONIC TRANSCEIVER WITH POWER MANAGEMENT

FIELD

Embodiments of the present disclosure generally relate to the field of optoelectronics and, more particularly, to optoelectronic transceivers.

BRIEF DESCRIPTION OF THE DRAWINGS

Embodiments of the optoelectronic transceiver with power management techniques of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Traditionally, optical technology has been geared toward longer haul systems with an emphasis on performance without consideration of power management. Optical transceivers were kept in an always functioning state where they draw power even if there is no traffic on the link. Increasingly, power management is becoming a concern for the use of optical interconnect technology in other contexts such as exascale computing, high performance computing (HPC) systems, and hyperscale data centers.

Embodiments of the present disclosure describe an optoelectronic transceiver with power management. In various embodiments, power management components and/or techniques may progressively disable components in the transceiver to save power when there is no data traffic. In some embodiments, a driver in a receive (RX) module may be disabled by shutting down at least a portion of the power to the RX module in a first power down mode link power state (L0s), a clock data recovery (CDR) circuit in the RX module may be disabled by shutting down at least a portion of the power to the CDR circuit in a second power down mode link power state (L1), a transmit re-timer and modulator in a transmit (TX) module may be disabled by shutting down at least a portion of the power to the transmit re-timer and modulator in a third power down mode link power state (L2), and a laser in the TX module may be disabled by shutting down at least a portion of the power to the laser in a fourth power down mode link power state (L3). In some embodiments, components of the transmit module may be disabled only after components of the receive module are disabled. In other embodiments, components of the transmit module may be disabled independently of components of the receive module.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
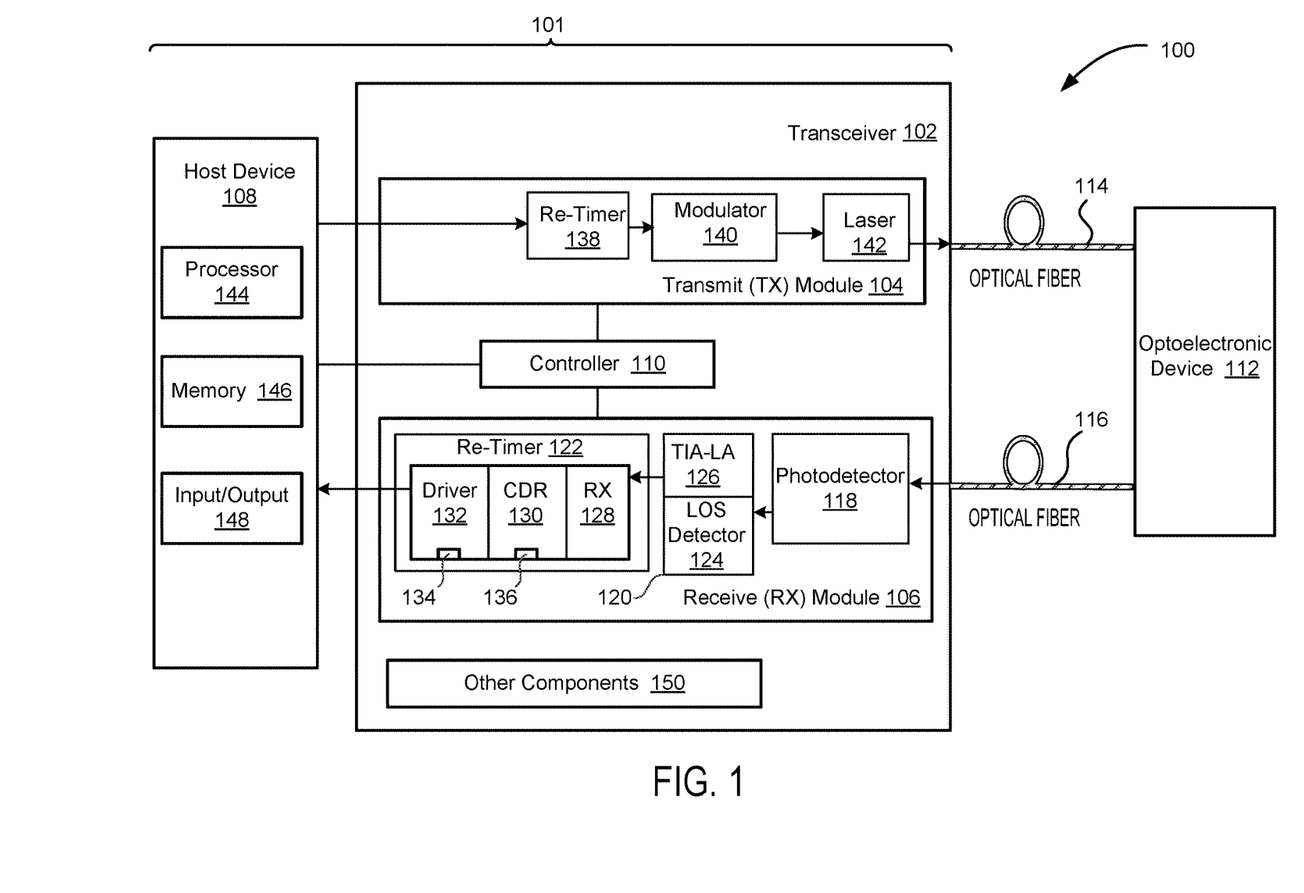
FIG. 1 is a block diagram of an optoelectronic system incorporated with an optoelectronic transceiver with power management of the present disclosure, according to various embodiments.

FIG. 1 is a block diagram of an optoelectronic system 100 that may include an optoelectronic transceiver with power management in accordance with some embodiments. The optoelectronic system 100 may be used to transmit and/or receive an optical signal modulated with a data signal over optical interconnects via one or more optical fibers or another optical transmission medium, for example, between racks in a data center, between servers, between computing components, or long-distance, between data storage facilities, data centers, and the like.

In various embodiments, the optoelectronic system 100 may include an optoelectronic apparatus (device) 101 having one or more transceivers 102 with one or more transmit (TX) modules 104 and one or more receive (RX) modules 106. In some embodiments, the optoelectronic device 101 may include a host device 108 that may be electrically coupled with the TX module 104 and/or the RX module 106. In various embodiments, a controller 110 may be coupled with the TX module 104, the RX module 106, and the host device 108. The controller 100 may include a processor, memory, and an input/output module in some embodiments.

In some embodiments, the transceiver 102 may convert electrical signals to optical signals and vice versa during communication between the host device 108 and another optoelectronic device 112. In various embodiments, the transceiver 102 may transmit optical signals from the TX module 104 over a first optical fiber 114 and may receive optical signals at the RX module 106 over a second optical fiber 116. In some embodiments, an optical transmission medium other than optical fibers may be used. In various embodiments, coupling capacitors may not be present on coupling links between the host device 108 and the transceiver 102, such as between the input/output device 148 and the driver 132 and/or between the input/output device 148 and the re-timer 138.

In some embodiments, the RX module 106 may include a photodetector 118, an amplification stage 120, and a re-timer 122. In various embodiments, the photodetector 118 may be a photodiode and the amplification stage 120 may include a loss of signal (LOS) detector 124 and a transimpedance amplifier with limiting amplifier (TIA-LA) 126. The re-timer 122 may include a receiver (RX) 128, a clock data recovery (CDR) circuit 130, and a driver 132 in some embodiments. In some embodiments, the driver 132 may be 50 ohm terminated and may operate at a very high data rate, resulting in consumption of a significant portion of the power of the RX module 106 during operation.

In various embodiments, the driver 132 may have a driver disable input 134 that may receive a signal to disable and power off the driver 132. In some embodiments, the CDR circuit 130 may have a CDR disable input 136 to disable and power off the CDR circuit 130. In some embodiments, for the lowest latency power down mode link power state (L0s), the driver 132 may pull both sides of a differential output to common-mode via high-Z impedance in response to a disable signal being presented at the driver disable input 134. In various embodiments, a latency of turn on and turn off of the driver 132 may be approximately 500 nanoseconds (ns). In some embodiments, the driver 132 on/off latency may be another value.

In some embodiments, the CDR circuit 130 may be disabled in a next lower power but higher latency power down mode link power state (L1). In some embodiments, the LOS detector 124 may be coupled with the CDR disable input 136 to disable the CDR circuit 130 in response to an optical signal not being received at the RX module 106 for a predetermined time period. Since the CDR circuit 130 loses lock when disabled, there is a latency due to a need to re-lock when the CDR circuit 130 is powered back on that may be approximately 5 to 10 microseconds (μs), which may be approximately ten times higher than the latency of L0 mode in various embodiments. In other embodiments, the LOS detector 124 may be coupled with the controller 110 which may write to the CDR disable input 136 in the re-timer 122 in response to a signal received from the LOS detector 124 at the controller 110. In some embodiments, the CDR disable input 136 may be a CDR disable register.

In some embodiments, the TX module 104 may include a re-timer 138, a modulator 140, and a laser 142. The re-timer 138 may receive an electrical signal from the host device 108, the modulator 140 may modulate an electrical signal from the re-timer 138, and the laser 142 may generate an optical signal based at least in part on a modulated electrical signal from the modulator 140. In various embodiments, the host device 108 may include a processor 144 coupled with a memory 146 and one or more input/output devices 148. The transceiver 102 may also include other components 150 such as voltage regulators or other components, modules, and/or circuits in various embodiments.

In various embodiments, AC coupling capacitors may not be present on at least some coupling links between the host device 108 and the transceiver 102, such as between the input/output device 148 and the driver 132 and/or between the input/output device 148 and the re-timer 138. In some embodiments, one or more coupling capacitors may be used. In some embodiments having links without AC coupling, attachment of a device at a far end of a link may be detected via a periodic detection/wake up pattern. In various embodiments, a master/slave configuration may be supported with detection and resultant activation of one more channels using a sequence started by a master device. In some embodiments, a symmetric arrangement (e.g., crosslink or networking) may be used where either end may initiate a detection sequence. In various embodiments, detection may be achieved in multiple ways, such as by observing a DC coupled termination resistor of a far end connection responding with a correct sequence.

In some embodiments, complementary metal-oxide semiconductor (CMOS) technology may be used for some components of the transceiver 102. In various embodiments, the re-timer 138, the modulator 140, the re-timer 122, and/or the amplification stage 120 may be CMOS components. In some embodiments, the laser 142 and/or the photodetector 118 may be non-CMOS components. In various embodiments, the power consumed by CMOS components may be higher than that of non-CMOS optical components. In some embodiments, power management may be performed with protocol enhancements that enable link power states to temporarily disable and at least partially shut off power to CMOS components of the transceiver 102.

In various embodiments, the link power states may be identified with terminology such as L0, L0s, L1, L2, and L3. The link power states and/or power down modes may be referred to differently in other embodiments. In various embodiments, the transceiver 102 may store one or more indicators corresponding to one or more current link power states of the RX module 106 and/or the TX module 104 in the controller 110. In some embodiments, the link power state L0 may correspond to a fully active power mode where the components of the transceiver 102 are operational, receiving power, and ready to function. In some embodiments, a power down mode indicated by a link power state of L2 may have a lower power and higher latency than link power state L1. In various embodiments, L2 may involve components of the TX module 104 and may correspond to a state where at least some components of the TX module 104 have been disabled by temporarily shutting off power to at least a portion of them. In some embodiments, components of the TX module 104 may be temporarily disabled only after components of the RX module 106 (e.g., driver 132, CDR circuit 130) have already been disabled. In other embodiments, components of the TX module 104 may be temporarily disabled independently of whether components of the RX module 106 have already been disabled. In some embodiments, an ultra-low power mode with a link power state of L3 may correspond to a state where the laser 142 has been temporarily disabled by shutting down power. In embodiments, disabling and turning on the laser 142 may have a higher latency than disabling and turning on the re-timer 138 and the modulator 140. In some embodiments, a reduction in average power of greater than twenty percent may be achieved by using these optical interconnect power management techniques in the transceiver 102.

In some embodiments, the LOS detector 124 may be coupled with the driver disable input 134 and/or the CDR disable input 136. In various embodiments, the LOS detector 124 may generate a first disable signal that may be provided to the driver disable input 134 in response to the LOS detector 124 determines that a first predetermined time period has elapsed since the RX module 106 last received an optical signal. In some embodiments, the LOS detector 124 may generate a second disable signal that may be provided to the CDR disable input 136 in response to the LOS detector 124 determines that a second predetermined time period has elapsed since the RX module 106 last received an optical signal.

In various embodiments, the LOS detector 124 may be coupled with the controller 110 and the controller 110 may be coupled with the driver disable input 134 and/or the CDR disable input 136. In some embodiments, the LOS detector 124 may generate a loss of signal indicator that may be provided to the controller 110 in response to the LOS detector 124 detects that an optical signal is not being received by the RX module 106. In various embodiments, the controller 110 may determine a time elapsed since an optical signal has last been received by the RX module 106 based at least in part on the loss of signal indicator from the LOS detector 124. In some embodiments, the controller 110 may generate a driver disable signal that may be provided to the driver disable input 134 in response to the controller 110 determines that the first predetermined time period has elapsed since the RX module 106 last received an optical signal. In some embodiments, the controller 110 may generate a CDR disable signal that may be provided to the CDR disable input 136 in response to the controller 110 determines that the second predetermined time period has elapsed since the RX module 106 last received an optical signal.

In various embodiments, the driver 132 may be disabled by shutting down at least a portion of the power to the driver 132 in response to receiving a driver disable signal at the driver disable input 134 from the LOS detector 124 or the controller 110. In some embodiments, the CDR circuit 130 may be disabled by shutting down at least a portion of the power to the CDR circuit 130 in response to receiving a CDR disable signal at the CDR disable input 136 from the LOS detector 124 or the controller 110. In some embodiments, the LOS detector 124 and/or the controller 110 may stop sending the CDR disable signal and/or the driver disable signal in response to the RX module 106 receiving an optical signal after the CDR circuit 130 and/or the driver 132 have been disabled. In various embodiments, the driver 130 may be re-enabled in response to no longer receiving a driver disable signal at the driver disable input 134. In some embodiments, the CDR circuit 130 may be re-enabled in response to no longer receiving a CDR disable signal at the CDR disable input 136.

In various embodiments, the LOS detector 124 and/or the controller 110 may send a driver enable signal to the driver 132 and/or a CDR enable signal to the CDR circuit 130 in response to the RX module 106 receiving an optical signal after the CDR circuit 130 and/or the driver 132 have been disabled. In some embodiments, the driver 130 may be re-enabled in response to receiving the driver enable signal from the LOS detector 124 or the controller 110. In various embodiments, the CDR circuit 130 may be re-enabled in response to receiving the CDR enable signal from the LOS detector 124 or the controller 110. In some embodiments, re-enabling the driver 132 and the CDR circuit 130 may include, cause, or result in powering up or restoration of power or any portion of power that had been shut down to the driver 132, or the CDR circuit 130 when they were disabled. The driver 132 and/or the CDR circuit 130 may be disabled and/or re-enabled in a different manner in other embodiments.

In various embodiments, the re-timer 138 and/or the modulator 140 may be disabled by shutting down at least a portion of the power to them in response to receiving one or more TX disable signals from the controller 110. In some embodiments, the controller 110 may generate the one or more TX disable signals in response to a first signal received at the controller 110 from the host device 108. In various embodiments, the laser 142 may be disabled by shutting down at least a portion of the power to the laser 142 in response to receiving a laser disable signal from the controller 110. In some embodiments, the controller 110 may generate the laser disable signal in response to a second signal received at the controller 110 from the host device 108. In various embodiments, the host 108 may send the first signal to the controller 110 in response to a first predetermined time period has elapsed since the host 108 last sent a message for transmission to the TX module 104. In some embodiments, the host 108 may send the second signal to the controller 110 in response to a second predetermined time period has elapsed since the host 108 last sent a message for transmission to the TX module 104. In various embodiments, the second predetermined time period may be longer than the first predetermined time period. The re-timer 138, the modulator 140, and/or the laser 142 may be disabled in a different manner in other embodiments.

In some embodiments, the transceiver 102 may start in a standard operating state of L0. In various embodiments, the transceiver 102 may enter a first power down state, L0s, where the driver 132 is disabled after a first predetermined time period has elapsed since the transceiver 102 last received an optical signal. In some embodiments, the transceiver 102 may enter a second power down state, L1, where the CDR circuit 130 is disabled after a second predetermined time period has elapsed since the transceiver 102 last received an optical signal. In various embodiments, the second predetermined time period may be longer than the first predetermined time period. In some embodiments, the transceiver 102 may enter a third power down state, L2, where the re-timer-138 and/or the modulator 140 may be disabled after a third predetermined time period has elapsed. In some embodiments, the third predetermined time period may be a predetermined time period since the transceiver 102 entered the second power down state, L2, during which the host 108 has not sent a message to the transceiver 102 for transmission with the TX module 104. In various embodiments, the transceiver may enter a fourth power down state, L3, where the laser 142 may be disabled after a fourth predetermined time period has elapsed. In some embodiments, the fourth predetermined time period may be longer than the third predetermined time period. In some embodiments, the fourth predetermined time period may be a predetermined time period that has elapsed since the transceiver 102 entered the second power down state, L2, during which the host 108 has not sent a message to the transceiver 102 for transmission with the TX module 104. In various embodiments, the fourth predetermined time period may be measured relative to other states or actions, such as in relation to when the transceiver 102 entered the third power down state, L3, during which the host 108 has not sent a message to the transceiver for transmission. In some embodiments, where the re-timer 138, modulator 140, and laser 142 are not disabled until the CDR circuit 130 has been disabled, the third predetermined time period may be longer than the second predetermined time period. In other embodiments, where the re-timer 138, modulator 140, and laser 142 may be disabled independently of whether the driver 132 and/or CDR circuit 130 have been disabled, the third predetermined time period may be shorter than the fourth predetermined time period but may have no relationship to the first or second predetermined time periods. The predetermined time periods may be programmable in some embodiments. The predetermined time periods may be dynamically configurable in some embodiments and the controller 110 or another component of the transceiver 102 may change them to account for varying conditions. In other embodiments, the predetermined time periods may be set at a time of manufacture of the transceiver 102.

In various embodiments, the controller 110 may stop sending the one or more TX disable signals and/or the laser disable signal in response to a signal from the host 108 that the host 108 has a message to send for transmission to the TX module 104. In some embodiments, the re-timer 138, modulator 140, and/or laser 142 of the TX module 104 may be re-enabled in response to no longer receiving the one or more TX disable signals and/or the laser disable signal. In various embodiments, the controller 110 may send one or more TX enable signals and/or a laser enable signal in response to a signal from the host 108 that the host 108 has a message to send for transmission to the TX module 104. In some embodiments, the re-timer 138, the modulator 140, and/or the laser 142 may be re-enabled in response to receiving the one or more TX enable signals and/or the laser enable signal. In some embodiments, re-enabling the re-timer 138, the modulator 140, and the laser 142 may include, cause, or result in powering up or restoration of power or any portion of power that had been shut down to the re-timer 138, the modulator 140, or the laser 142 when they were disabled. The re-timer 138, the modulator 140, and/or the laser 142 may be re-enabled in a different manner in other embodiments.

Figure 2:
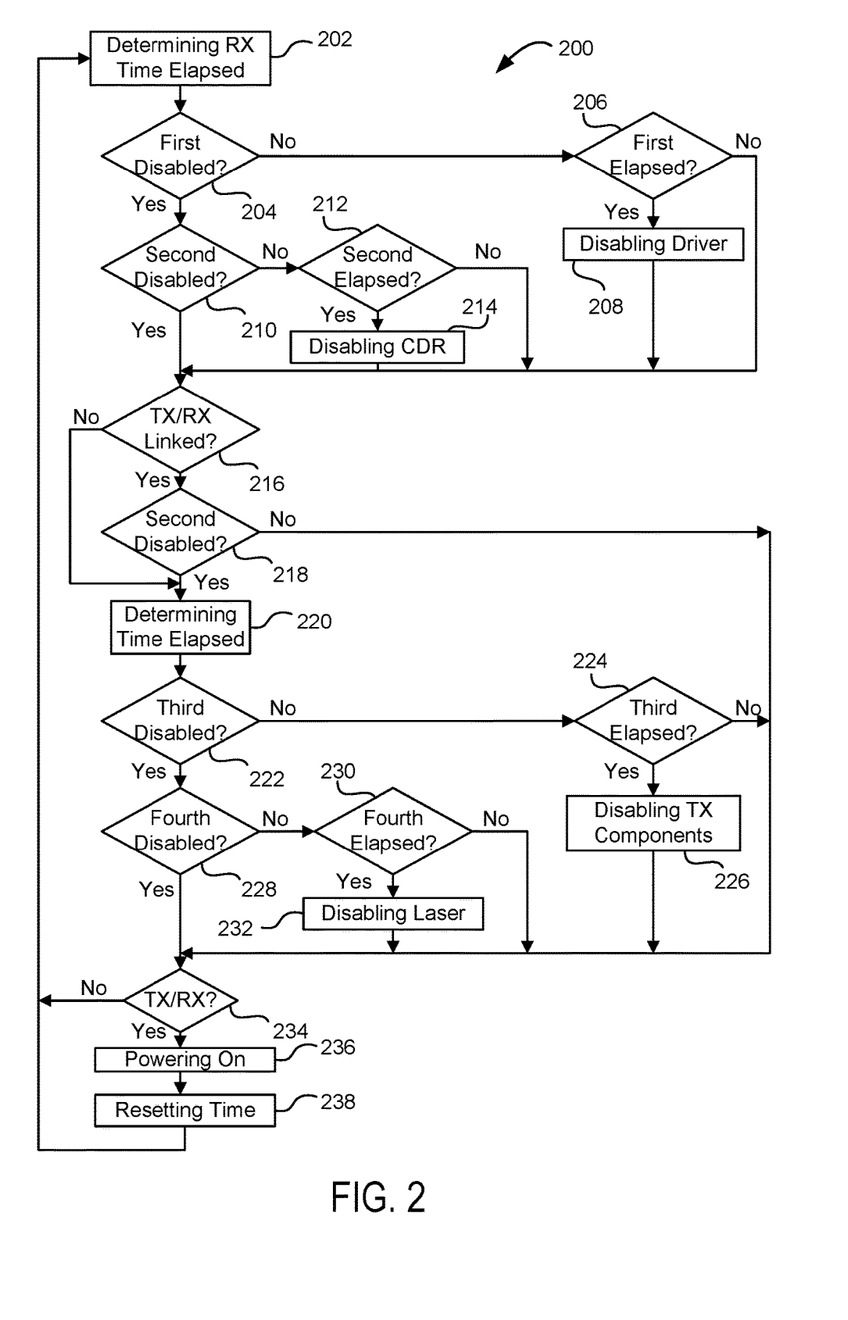
FIG. 2 is a flow diagram illustrating a method of power management for an optoelectronic transceiver, according to various embodiments.

FIG. 2 is a flow diagram illustrating a method 200 of power management for an optoelectronic transceiver, according to various embodiments. In embodiments, the method 200 may be practiced to manage power for a transceiver such as the transceiver 102 described with respect to FIG. 1, e.g., by controller 110 of FIG. 1 (optionally, in conjunction with other components of FIG. 1).

At a block 202, the method 200 may include determining how much time has elapsed since an optical signal has been received at a receive module of an optoelectronic transceiver such as the receive module 106 described with respect to FIG. 1. In some embodiments, a LOS detector such as the LOS detector 124 may detect that an optical signal is not being received by the photodetector 118 based at least in part on a signal generated by the photodetector 118. In various embodiments, the LOS detector or a controller such as the controller 110 may determine how much time has elapsed since an optical signal has been received.

At a decision block 204, the method 200 may include determining whether a first component of the transceiver 102 has been disabled such as by shutting off at least a portion of power to the first component. In some embodiments, the first component may be a driver of an RX module such as the driver 132. In some embodiments, determining whether the first component has been disabled may be performed by determining whether the transceiver 102 is currently in a power down state where the first component has already been disabled (e.g., L0s, L1). In some embodiments, TX components may be disabled after RX components have been disabled, and power down states relating to the TX components (e.g., L2, L3) may also indicate that the first component has already been disabled. In other embodiments, where TX components may be disabled independently of RX components, power down states relating to the TX components may not necessarily indicate that the first component has already been disabled. If, at the decision block 204, it is determined that the first component has not been disabled, the method 200 may proceed to a decision block 206 that may include determining whether a first time period has elapsed since an optical signal was last received at the RX module. If, the first time period has elapsed, the method 200 may include disabling a first component such as the driver 132 at a block 208. In some embodiments, the transceiver 102 may also store an indication that a first power down state (e.g., L0s) has been entered at the block 208. The indication that L0s has been entered may be stored in the controller 110 in some embodiments.

If, at the decision block 204, it is determined that the first component of the transceiver 102 has been disabled, the method 200 may proceed to a decision block 210 that may include determining whether a second component of the transceiver has been disabled such as by shutting off at least a portion of power to the second component. In some embodiments, the second component may be a CDR circuit of an RX module such as the CDR circuit 130. In some embodiments, determining whether the second component has been disabled may be performed by determining whether the transceiver 102 is currently in a power down state where the second component has already been disabled (e.g., L1). If, at the decision block 210, it is determined that the second component has not been disabled, the method 200 may proceed to a decision block 212 that may include determining whether a second time period has elapsed since an optical signal was last received at the RX module. If, the second time period has elapsed, the method 200 may include disabling the second component such as the CDR circuit 130 at a block 214. In some embodiments, the transceiver 102 may also store an indication that a second power down state (e.g., L1) has been entered at the block 214. The indication that L1 has been entered may be stored in the controller 110 in some embodiments.

If, at the decision block 210, it is determined that the second component has been disabled, the method may include determining whether power management of TX components is linked to power management of RX components at a decision block 216. In various embodiments, the method 200 may also proceed to the decision block 216 if, at the decision block 206, it is determined that the first time period has not elapsed; if, at the decision block 212, it is determined that the second time period has not elapsed; after the first component is disabled at the block 208; or after the second component is disabled at the block 214.

If, at the decision block 216, it is determined that power management of TX components is linked to power management of RX components, it may be determined whether the second component has been disabled at a decision block 218. In various embodiments, it may be determined whether the CDR circuit 130 has been disabled at the decision block 218. In some embodiments, determining whether the second component has been disabled may be performed by determining whether the transceiver 102 is currently in a power down state where the second component has already been disabled (e.g., L1). If, at the decision block 218 it is determined that the second component has been disabled, or if, at the decision block 216, it is determined that power management of TX components is not linked to power management of RX components, the method 200 may include determining a first time elapsed since a host device such as the host device 108 has last sent a signal to a transmit module such as the transmit module 104. In some embodiments, the controller 110 may determine how much time has elapsed since the host device 108 last sent a signal to the transmit module 104. In other embodiments the host device 108 may determine how much time has elapsed since it last sent a signal to the transmit module 104.

At a decision block 222, it may be determined whether a third component has been disabled. In various embodiments, the third component may include one or more transmit module components such as the re-timer 138 and/or the modulator 140 of the TX module 104. In some embodiments, it may be determined whether both the re-timer 138 and the modulator 140 have been disabled. In some embodiments, determining whether the third component has been disabled may be performed by determining whether the transceiver 102 is currently in a power down state where the third component has already been disabled (e.g., L2, L3). If, at the decision block 222, it is determined that the third component has not been disabled, the method 200 may include determining whether a third time period has elapsed. In some embodiments, the third time period may be a predetermined time period since the host device has last sent a signal to the transmit module. In some embodiments, the controller 110 may determine whether the third time period has elapsed. In other embodiments, the host device 108 may determine whether the third time period has elapsed and may send a time period indicator to the controller 110 based at least in part on whether the third time period has elapsed.

If, at the decision block 224, it is determined that the third time period has elapsed, the method 200 may include disabling one or more TX components at a block 226. In various embodiments, the re-timer 138 and the modulator 140 of the TX module 104 may be disabled at the block 226 by shutting down at least a portion of the power to the re-timer 138 and the modulator 140. In some embodiments, the transceiver 102 may also store an indication that a third power down state (e.g., L2) has been entered at the block 226. The indication that L2 has been entered may be stored in the controller 110 in some embodiments. In various embodiments, the one or more TX components may be disabled by the controller 110 generating one or more disable signals that may be provided to one or more disable inputs of the re-timer 138 and/or modulator 140 in response to a signal received at the controller 110 from the host device 108. In some embodiments, the re-timer 138 and the modulator 140 may be turned off independently of each other rather than together in response to one or more predetermined time periods since the host device has last sent a signal to the transmit module. In various embodiments with independent disabling of the re-timer 138 and the modulator 140, separate power down states may correspond to the disabling of the re-timer 138 and the modulator 140, with an indication that each of the separate power down states have been entered being stored in the controller 110 in some embodiments.

If, at the decision block 222, it is determined that the third component has been disabled, such as if it is determined that the re-timer 138 and the modulator 140 have been disabled, the method 200 may determine whether a fourth component has been disabled at a decision block 228. In some embodiments, it may be determined whether a light source such as the laser 142 has been disabled at the decision block 228. In some embodiments, determining whether the fourth component has been disabled may be performed by determining whether the transceiver 102 is currently in a power down state where the fourth component has already been disabled (e.g., L3).

If, at the decision block 228, it is determined that the fourth component has not been disabled, the method 200 may include determining whether a fourth time period has elapsed at a decision block 230. In some embodiments, the fourth time period may be a second predetermined time period since the host device has last sent a signal to the transmit module. In some embodiments, the controller 110 may determine whether the fourth time period has elapsed. In other embodiments, the host device 108 may determine whether the fourth time period has elapsed and may send a time period indicator to the controller 110 based at least in part on whether the fourth time period has elapsed. If, at the decision block 230, it is determined that the fourth time period has elapsed, the method 200 may include disabling a light source of the TX module such as the laser 142 at a block 232 by shutting down at least a portion of the power to the light source. In some embodiments, the transceiver 102 may also store an indication that a fourth power down state (e.g., L3) has been entered at the block 232. The indication that L3 has been entered may be stored in the controller 110 in some embodiments. In various embodiments, the laser 142 may be disabled in response to the controller 110 generating a disable signal that may be provided to a disable input of the laser 142 in response to a signal received at the controller 110 from the host device 108.

In various embodiments, it may be determined whether an optical signal has been received by the RX module 106 and/or the host device 108 has presented a signal to the TX module 104 for transmission at a decision block 234. In some embodiments, the method 200 may proceed to the decision block 234 if it is determined that the fourth component has been disabled at the decision block 228; after disabling the laser at the block 232; after disabling one or more TX components at the block 226; if it is determined that the third time period has not elapsed at the decision block 224; or if it is determined that the second component is not disabled at the decision block 218.

If, at the decision block 234, it is determined that an optical signal has been received by the RX module 106 or the host device 108 has presented a signal to the TX module 104 for transmission, the method 200 may include powering up one or more components at a block 236. In some embodiments, any disabled RX or TX components that have been powered down may be powered up at the block 236. In other embodiments, the components powered up may relate to the type of signal (TX or RX) detected at the decision block 234. In some embodiments, only TX components (e.g., re-timer 138, modulator 140, laser 142) may be powered up if a signal is received by the TX module 104 from the host device 108 for transmission. In various embodiments, only RX components (e.g., driver 132, CDR circuit 130) may be powered up if an optical signal is received at the RX module 106. In some embodiments, both RX and TX components may be powered up if an optical signal is received and/or a signal is sent to the TX module for transmission. In various embodiments, the link power state may also change when the one or more components are powered up at the block 236 (e.g., changing from L3, L2, L1, or L0s to L0). In some embodiments, an indicator corresponding to the changed link power state may be stored in the controller 110 or another component.

At a block 238, the method 200 may include resetting one or more timers. In some embodiments, a timer that tracks the time elapsed since an optical signal has last been received at the receive module and/or a timer that tracks the time elapsed since the host device has sent a signal to the TX module for transmission may be reset at the block 238. In some embodiments, one or more of the timers may be included in the controller 110, the LOS detector 124, another component of the transceiver 102, and/or the host device 108. In various embodiments, these timers may be used for determining the time elapsed since an optical signal has last been received at the block 202 and/or the time elapsed since the host device has sent a signal to the TX module for transmission at the block 220. In various embodiments, the method 200 may return to the block 202 if, at the decision block 234, it is determined that an optical signal has not been received at the RX module and a signal has not been presented to the TX module for transmission. In some embodiments, the method 200 may also return to the block 202 after any timers have been reset at the block 238.

In various embodiments, one or more of the driver 132, the CDR 130, the re-timer 138, the modulator 140, or the laser 142 may be disabled by shutting down all power to the component. In various embodiments, one or more of the driver 132, the CDR 130, the re-timer 138, the modulator 140, or the laser 142 may be disabled by shutting down a portion of the power to the component. In some embodiments, one or more of the driver 132, the CDR 130, the re-timer 138, the modulator 140, or the laser 142 may be disabled by a method other than shutting down power to the component.

Figure 3:
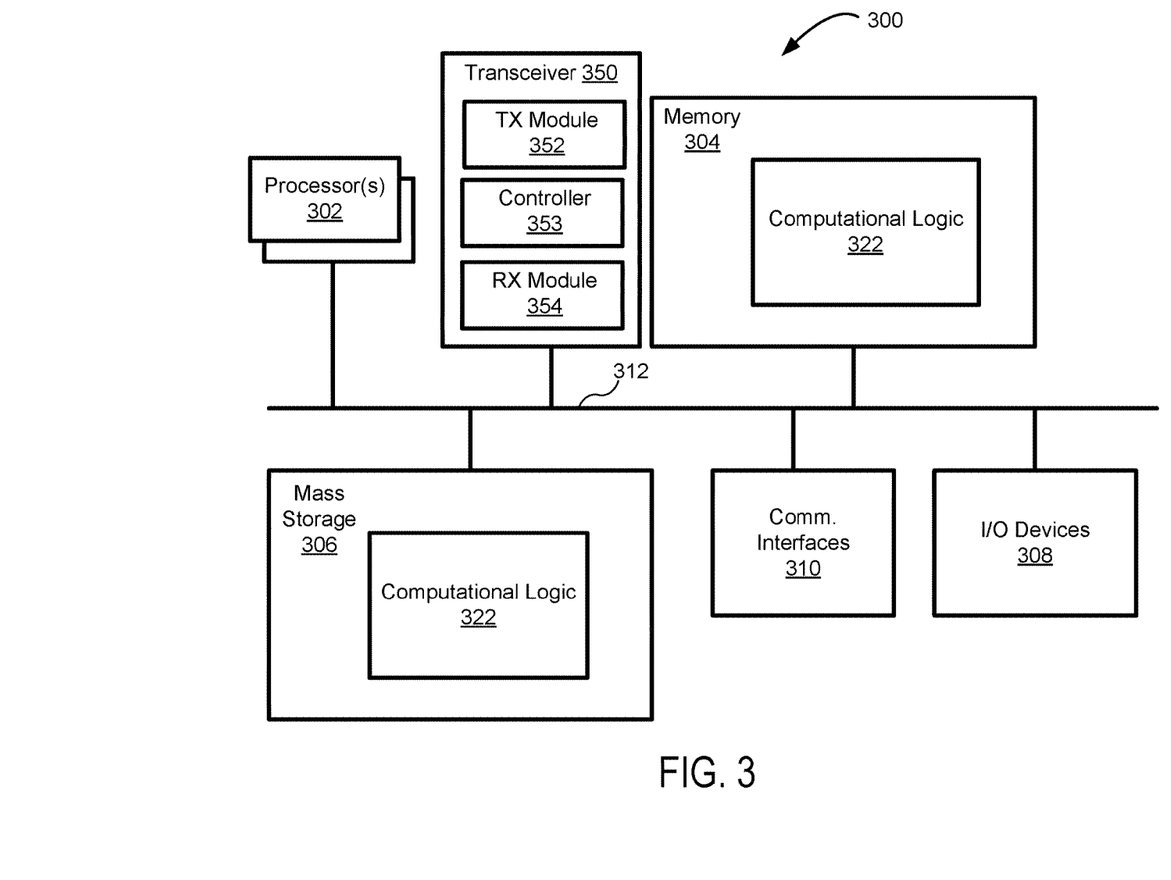
FIG. 3 schematically illustrates an example computing device having a transceiver with power management, according to various embodiments.

FIG. 3 illustrates an example computing device 300 that may include components corresponding to and/or implementing various components and methods of FIGS. 1-2, such as transceiver 102 with TX module 104 and RX module 106, and/or host device 108 described with respect to FIG. 1, in accordance with various embodiments. As shown, computing device 300 may include one or more processors or processor cores 302 and system memory 304. For the purpose of this application, including the claims, the terms "processor" and "processor cores" may be considered synonymous, unless the context clearly requires otherwise. The processor 302 may include any type of processors, such as a central processing unit (CPU), a microprocessor, and the like. The processor 302 may be implemented as an integrated circuit having multi-cores, e.g., a multi-core microprocessor. The computing device 300 may include mass storage devices 306 (such as diskette, hard drive, volatile memory (e.g., dynamic random-access memory (DRAM), compact disc read-only memory (CD-ROM), digital versatile disk (DVD), and so forth). In general, system memory 304 and/or mass storage devices 306 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 300 may further include input/output devices 308 (such as a display (e.g., a touchscreen display), keyboard, cursor control, remote control, gaming controller, image capture device, and so forth) and communication interfaces 310 (such as network interface cards, modems, infrared receivers, radio receivers (e.g., Bluetooth), and so forth). The computing device 300 may include a transceiver 350 having power management capabilities that may include a TX module 352, a controller 353, and a RX module 354. In various embodiments, the transceiver 350 may be configured similarly to the transceiver 102, the TX module 352 may be configured similarly to the TX module 104, the controller 353 may be configured similarly to the controller 110, and/or the RX module 354 may be configured similarly to the RX module 106. In some embodiments, the computing device 300 may include a portion of the transceiver 350, such as the TX module 352 and/or the RX module 354 without including other components of the transceiver 350 such as the controller 353 with other components of the computing device 300 performing the functions of the controller 353. In some embodiments, the transceiver 350 (or portion thereof) may be part of communication interfaces 310, or a communication device attached thereto, or one of I/O devices 308.

The communication interfaces 310 may include communication chips (not shown) that may be configured to operate the device 300 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 310 may operate in accordance with other wireless protocols in other embodiments.

The above-described computing device 300 elements may be coupled to each other via system bus 312, which may represent one or more buses. In the case of multiple buses, they may be bridged by one or more bus bridges (not shown). Each of these elements may perform its conventional functions known in the art. In particular, system memory 304 and mass storage devices 306 may be employed to store a working copy and a permanent copy of the programming instructions, such as drivers, for the operation of various components of computer system 300, including but not limited to operation of the host 108 of FIG. 1, the transceiver 102 of FIG. 1, the processor 144 of FIG. 1, the controller 110 of FIG. 1, an operating system of computer system 300, and/or one or more applications, collectively referred to as computational logic 322. The various elements may be implemented by assembler instructions supported by processor(s) 302 or high-level languages that may be compiled into such instructions.

The permanent copy of the programming instructions may be placed into mass storage devices 306 in the factory or in the field through, for example, a distribution medium (not shown), such as a compact disc (CD), or through communication interface 310 (from a distribution server (not shown)). That is, one or more distribution media having an implementation of the agent program may be employed to distribute the agent and to program various computing devices.

The number, capability, and/or capacity of the elements 308, 310, 312 may vary, depending on whether computing device 300 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 302 may be packaged together with all or portions of computational logic 322 configured to facilitate aspects of embodiments described herein to form a System in Package (SiP) or a System on Chip (SoC).

The computing device 300 may include or otherwise be associated with an optoelectronic system that may include components and/or implement methods described with respect to FIGS. 1-2, such as the host device 108, the transceiver 102, the TX module 104, the RX module 106, or the controller 110 as described above, and in particular the embodiments of the transceiver 102 described in reference to FIGS. 1-2. In some embodiments, one or more components such as processor 302 may be included as a part of the optoelectronic device 101.

In various implementations, the computing device 300 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 300 may be any other electronic device that processes data.

Figure 4:
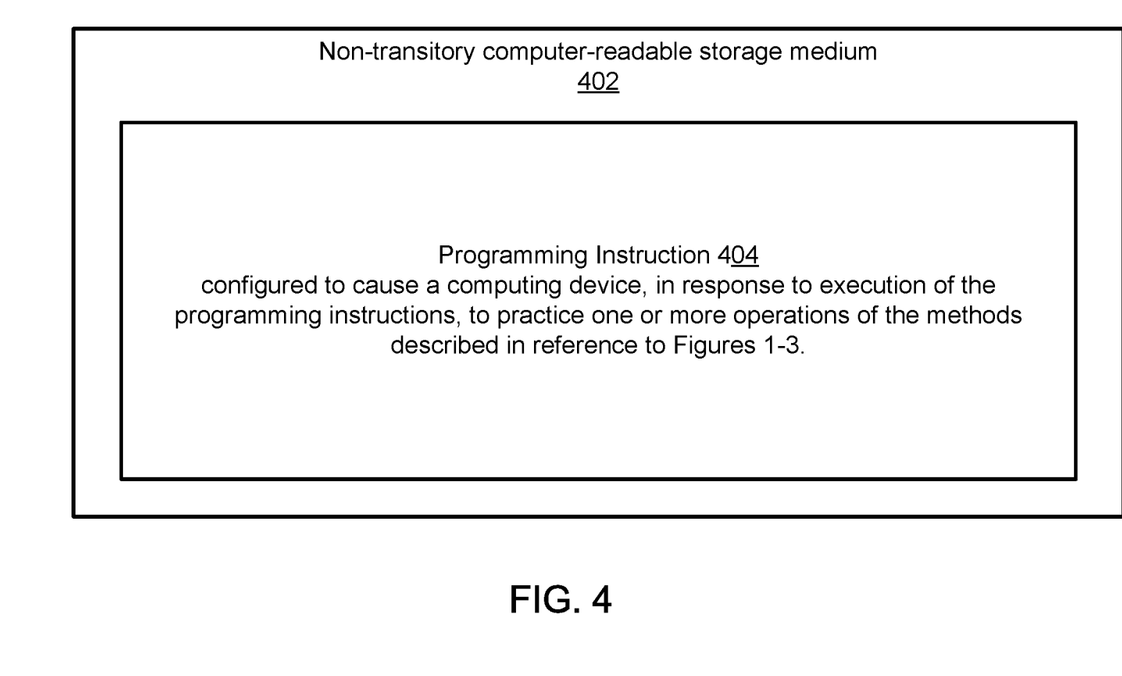
FIG. 4 illustrates an example storage medium with instructions configured to enable an apparatus to practice various aspects of the present disclosure, in accordance with various embodiments.

FIG. 4 illustrates example computer-readable storage medium 402 having instructions configured to practice all or selected ones of the operations associated with the computing device 300, earlier described with respect to FIG. 3; the host device 108 of FIG. 1; the transceiver 102; and/or the controller 110 of FIG. 1, in accordance with various embodiments. As illustrated, computer-readable storage medium 402 may include a number of programming instructions 404. The storage medium 402 may represent a broad range of non-transitory persistent storage medium known in the art, including but not limited to flash memory, dynamic random access memory, static random access memory, an optical disk, a magnetic disk, etc. Programming instructions 404 may be configured to enable a device, e.g., computer 300, host device 108, transceiver 102, and/or controller 110 in response to execution of the programming instructions 404, to perform, e.g., but not limited to, various operations described for the TX module 104, the RX module 106, the controller 110, and/or the host device 108 shown in FIG. 1, or operations shown in process 200 of FIG. 2. In alternate embodiments, programming instructions 404 may be disposed on multiple computer-readable storage media 402. In alternate embodiment, storage medium 402 may be transitory, e.g., signals encoded with programming instructions 404.

Referring back to FIG. 3, for an embodiment, at least one of processors 302 may be packaged together with memory having all or portions of computational logic 322 configured to practice aspects described for the TX module 104, the RX module 106, the controller 110, and/or the host device 108 shown in FIG. 1, or operations shown in process 200 of FIG. 2. For an embodiment, at least one of processors 302 may be packaged together with memory having all or portions of computational logic 322 configured to practice aspects described for the TX module 104, the RX module 106, the controller 110, and/or the host device 108 shown in FIG. 1, or operations shown in process 200 of FIG. 2 to form a System in Package (SiP). For an embodiment, at least one of processors 302 may be integrated on the same die with memory having all or portions of computational logic 322 configured to practice aspects described for the TX module 104, the RX module 106, the controller 110, and/or the host device 108 shown in FIG. 1, or operations shown in process 200 of FIG. 2. For an embodiment, at least one of processors 302 may be packaged together with memory having all or portions of computational logic 322 configured to practice aspects of the TX module 104, the RX module 106, the controller 110, and/or the host device 108 shown in FIG. 1, or operations shown in process 200 of FIG. 2 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an optoelectronic device comprising: a photodetector to receive an optical signal and generate an electrical signal based at least in part on the optical signal; a loss of signal detector coupled with the photodetector; and a re-timer coupled with the loss of signal detector, wherein a component of the re-timer is to be disabled in response to a detection by the loss of signal detector that the optical signal has not been received for a predetermined time period.

Example 2 may include the subject matter of Example 1, wherein the loss of signal detector is coupled with a driver disable input of the re-timer and the component is a driver component of the re-timer.

Example 3 may include the subject matter of Example 1, wherein the loss of signal detector is coupled with a clock data recovery (CDR) circuit disable input of the re-timer and the component is a CDR component of the re-timer.

Example 4 may include the subject matter of any one of Examples 1-3, wherein: the loss of signal detector is coupled with a driver disable input of the re-timer; the loss of signal detector is coupled with a clock data recovery (CDR) disable input of the re-timer; the predetermined time period is a first predetermined time period; the component is a driver component of the re-timer to be disabled in response to the detection by the loss of signal detector that the optical signal has not been received for the first predetermined time period; and a CDR component of the re-timer is to be disabled in response to the detection by the loss of signal detector that the optical signal has not been received for a second predetermined time period longer than the first predetermined time period.

Example 5 may include the subject matter of any one of Examples 1-2, further comprising a controller coupled with the loss of signal detector and a clock data recovery (CDR) disable input of the re-timer, wherein the controller is to disable a CDR component of the re-timer in response to a signal received from the loss of signal detector.

Example 6 may include the subject matter of any one of Examples 1-5, wherein the disabled component of the re-timer is to be re-enabled in response to a detection by the loss of signal detector that the optical signal is received.

Example 7 may include an optoelectronic system comprising: a transmit module having a re-timer, a modulator, and a laser; and a host device coupled with the transmit module; wherein the transmit module re-timer and modulator are to be disabled in response to a lapse of a predetermined time period where the host device has last sent a signal to the transmit module.

Example 8 may include the subject matter of Example 7, wherein the signal is a first signal and the transmit module re-timer and modulator are to be re-enabled in response to the host device has sent a second signal to the transmit module.

Example 9 may include the subject matter of any one of Examples 7-8, further comprising a receive module coupled with the host device, wherein the transmit module re-timer and modulator are to be disabled in response to the lapse of the predetermined time period where the host device has last sent a signal to the transmit module after a component of the receive module has been disabled.

Example 10 may include the subject matter of any one of Examples 7-9, wherein the component of the receive module is a clock data recovery (CDR) circuit.

Example 11 may include the subject matter of any one of Examples 7-10, wherein the predetermined time period is a first predetermined time period; wherein the laser is to be disabled in response to a lapse of a second predetermined time period since the host device has last sent a signal to the transmit module, wherein the second predetermined time period is longer than the first predetermined time period.

Example 12 may include the subject matter of any one of Examples 7-11, further comprising a controller coupled with the host device and the transmit module, wherein the controller is to disable the transmit module re-timer and modulator in response to a signal from the host device.

Example 13 may include a method of managing power consumed by an optoelectronic transceiver comprising: determining how much time has elapsed since an optical signal has been received at a receive module; and disabling a component of the optoelectronic transceiver in response to a lapse of an amount of time since an optical signal has last been received exceeds a predetermined time period.

Example 14 may include the subject matter of Example 13, wherein the component is a driver.

Example 15 may include the subject matter of any one of Examples 13-14, wherein the component is a first component, and the predetermined time period is a first predetermined time period; and wherein the method further comprises disabling a second component of the optoelectronic transceiver in response to an amount of time elapsed since the optical signal has last been received has exceeded a second predetermined time period, wherein the second predetermined time period is longer than the first predetermined time period.

Example 16 may include the subject matter of Example 15, wherein the second component is a clock data recovery (CDR) circuit.

Example 17 may include the subject matter of any one of Examples 15-16, further comprising disabling a transmit module re-timer and modulator after the second component is disabled in response to a lapse of a third predetermined time period since a signal has been sent to the transmit module for transmission.

Example 18 may include the subject matter of Example 17, further comprising disabling a transmit module laser after the transmit module re-timer and modulator are disabled in response to a lapse of a fourth predetermined time period since a signal has been sent to the transmit module for transmission, wherein the fourth predetermined time period is longer than the third predetermined time period.

Example 19 may include the subject matter of any one of Examples 13-18, further comprising powering up the first component in response to the optical signal is being received by the receive module.

Example 20 may include at least one computer-readable medium comprising instructions stored thereon that, in response to execution of the instructions by a computing device, cause the computing device to disable a component of a receive module in an optoelectronic transceiver in response to receiving a signal from a receive module loss of signal detector.

Example 21 may include the subject matter of Example 20, wherein the component of the receive module is a clock data recovery (CDR) circuit.

Example 22 may include the subject matter of any one of Examples 20-21, wherein the instructions are further to cause the computing device to enable the component of the receive module in response to no longer receiving the signal from the receive module loss of signal detector.

Example 23 may include the subject matter of any one of Examples 20-22, wherein the instructions are further to cause the computing device to disable a component of a transmit module in response to receiving a disable signal from a host device.

Example 24 may include the subject matter of Example 23, wherein the component of the transmit module includes a re-timer and a modulator.

Example 25 may include the subject matter of any one of Examples 23-24, wherein the disable signal is a first disable signal, and wherein the instructions are further to cause the computing device to disable a laser of the transmit module in response to receiving a second disable signal from the host device.

Example 26 may include an optoelectronic transceiver comprising: means for determining how much time has elapsed since an optical signal has been received at a receive module; and means for disabling a component of the optoelectronic transceiver in response to a lapse of an amount of time since an optical signal has last been received exceeds a predetermined time period.

Example 27 may include the subject matter of Example 26, wherein the component is a driver.

Example 28 may include the subject matter of any one of Examples 26-27, wherein the component is a first component, and the predetermined time period is a first predetermined time period; and wherein the optoelectronic transceiver further comprises means for disabling a second component of the optoelectronic transceiver in response to an amount of time elapsed since the optical signal has last been received has exceeded a second predetermined time period, wherein the second predetermined time period is longer than the first predetermined time period.

Example 29 may include the subject matter of Example 28, wherein the second component is a clock data recovery (CDR) circuit.

Example 30 may include the subject matter of any one of Examples 28-29, further comprising means for disabling a transmit module re-timer and modulator after the second component is disabled in response to a lapse of a third predetermined time period since a signal has been sent to the transmit module for transmission.

Example 31 may include the subject matter of Example 30, further comprising means for disabling a transmit module laser after the transmit module re-timer and modulator are disabled in response to a lapse of a fourth predetermined time period since a signal has been sent to the transmit module for transmission, wherein the fourth predetermined time period is longer than the third predetermined time period.

Example 32 may include the subject matter of any one of Examples 26-31, further comprising means for powering up the first component in response to the optical signal is being received by the receive module.

Example 33 may include the subject matter of any one of Examples 20-21, wherein the instructions are further to cause the computing device to enable the component of the receive module in response to receiving an enable signal from the receive module loss of signal detector.

Example 34 may include the subject matter of any one of Examples 15-16, further comprising powering up the first component and the second component in response to the optical signal is being received by the receive module.

Example 35 may include the subject matter of any one of Examples 17-18, further comprising powering up the transmit module re-timer and modulator in response to a signal being sent to the transmit module for transmission.

Example 36 may include the subject matter of Example 18, further comprising powering up the laser, the transmit module re-timer, and the modulator in response to a signal being sent to the transmit module for transmission.

Example 37 may include the subject matter of any one of Examples 28-29, further comprising means for powering up the first component and the second component in response to the optical signal is being received by the receive module.

Example 38 may include the subject matter of any one of Examples 30-31, further comprising means for powering up the transmit module re-timer and modulator in response to a signal being sent to the transmit module for transmission.

Example 39 may include the subject matter of Example 31, further comprising means for powering up the laser, the transmit module re-timer, and the modulator in response to a signal being sent to the transmit module for transmission.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An optoelectronic device comprising:
    a photodetector to receive an optical signal and generate an electrical signal based at least in part on the optical signal;
    a loss of signal detector coupled with the photodetector, to detect when the photodetector is not receiving the optical signal; and
    a re-timer coupled with the loss of signal detector, wherein a first component of the re-timer is to be disabled in response to a detection by the loss of signal detector that the optical signal has not been received for a first predetermined time period, and wherein a second component of the re-timer is to be disabled in response to a detection by the loss of signal detector that the optical signal has not been received for a second predetermined time period, the second predetermined time period being longer than the first predetermined time period.

2. The optoelectronic device of claim 1, wherein the loss of signal detector is coupled with a driver disable input of the re-timer and the first component is a driver component of the re-timer.

3. The optoelectronic device of claim 1, wherein the loss of signal detector is coupled with a clock data recovery (CDR) circuit disable input of the re-timer and the first component is a CDR component of the re-timer.

4. The optoelectronic device of claim 1, wherein:
    the loss of signal detector is coupled with a driver disable input of the re-timer;
    the loss of signal detector is coupled with a clock data recovery (CDR) disable input of the re-timer;
    the first component is a driver component of the re-timer; and
    the second component is a CDR component of the re-timer.

5. The optoelectronic device of claim 1, further comprising a controller coupled with the loss of signal detector and a clock data recovery (CDR) disable input of the re-timer, wherein the first component is a CDR, and wherein the controller is to disable the first component of the re-timer in response to the detection by the loss of signal detector that the optical signal has not been received for the first predetermined time period.

6. The optoelectronic device of claim 1, wherein the first component and the second component of the re-timer are to be re-enabled in response to a detection by the loss of signal detector that the optical signal is received.

7. An optoelectronic system comprising:
    transmit circuitry having a re-timer, a modulator, and a laser; and
    a host device coupled with the transmit circuitry, wherein the re-timer and the modulator are to be disabled in response to a lapse of a first predetermined time period since the host device has last sent a signal to the transmit circuitry, wherein the laser is to be disabled in response to a lapse of a second predetermined time period since the host device has last sent the signal to the transmit circuitry, wherein the second predetermined time period is longer than the first predetermined time period.

8. The optoelectronic system of claim 7, wherein the signal is a first signal and the re-timer and the modulator are to be re-enabled in response to the transmit circuitry receiving a second signal from the host device.

9. The optoelectronic system of claim 7, further comprising receive circuitry coupled with the host device, wherein the re-timer and the modulator are to be disabled in response to the lapse of the first predetermined time period where the host device has last sent the signal to the transmit circuitry after a component of the receive circuitry has been disabled.

10. The optoelectronic system of claim 9, wherein the component of the receive circuitry is a clock data recovery (CDR) circuit.

11. The optoelectronic system of claim 7, further comprising a controller coupled with the host device and the transmit circuitry, wherein the controller is to disable the re-timer and the modulator in response to the signal from the host device.

12. At least one non-transitory computer-readable medium comprising instructions stored thereon that, in response to execution of the instructions by a computer device, cause the computer device to:
monitor reception of an optical signal by a photodetector;
disable a first component of receive circuitry in response to a determination that the optical signal has not been received for a first predetermined period of time, wherein the receive circuitry is utilized for the reception of the optical signal; and
disable a second component of the receive circuitry in response to a determination that the optical signal has not been received for a second predetermined period of time, wherein the second predetermined period of time is longer than the first predetermined period of time.

13. The at least one non-transitory computer-readable medium of claim 12, wherein the first component of the receive circuitry is a clock data recovery (CDR) circuit.

14. The at least one non-transitory computer-readable medium of claim 12, wherein the instructions are further to cause the computer device to enable the first component of the receive circuitry in response to a determination that reception of the optical signal has resumed.

15. The at least one non-transitory computer-readable medium of claim 12, wherein the instructions are further to cause the computer device to disable a component of a transmit circuitry in response to receiving a disable signal from a host device.

16. The at least one non-transitory computer-readable medium of claim 15, wherein the component of the transmit circuitry includes a re-timer and a modulator.

17. The at least one non-transitory computer-readable medium of claim 15, wherein the disable signal is a first disable signal, and wherein the instructions are further to cause the computer device to disable a laser of the transmit circuitry in response to receiving a second disable signal from the host device.

* * * * *